United States Patent [19]
Aumiller et al.

[11] Patent Number: 5,758,811
[45] Date of Patent: Jun. 2, 1998

[54] ROLL-UP STORAGE SYSTEM

[75] Inventors: Curtis D. Aumiller; Melissa L. Piatek, both of Holland, Mich.

[73] Assignee: Prince Corporation, Holland, Mich.

[21] Appl. No.: 751,172

[22] Filed: Nov. 15, 1996

[51] Int. Cl.⁶ .................................................. B60R 7/12
[52] U.S. Cl. ........................ 224/563; 224/543; 224/915
[58] Field of Search ................................ 224/563, 544, 224/543, 539, 0.5, 915

[56] References Cited

U.S. PATENT DOCUMENTS

| | | |
|---|---|---|
| Re. 26,299 | 11/1967 | Burns. |
| 1,892,601 | 12/1932 | Beehler .................. 224/563 X |
| 2,778,553 | 1/1957 | Satrom et al. .......... 224/563 X |
| 3,632,029 | 1/1972 | Sonner. |
| 5,152,440 | 10/1992 | Chao ...................... 224/563 X |
| 5,469,977 | 11/1995 | Tipton .................... 224/915 |

*Primary Examiner*—Renee S. Luebke
*Attorney, Agent, or Firm*—Price, Heneveld, Cooper, DeWitt & Litton

[57] ABSTRACT

A roll-up storage pouch has a generally rectangular sheet of flexible material with one edge anchored to a door panel and integrally including a constant-force flat spring which in a stable state is coiled and which can be uncoiled and straightened. The rectangular flexible member thus can be rolled up and enclose items, such as an umbrella, therein for storage. In a preferred embodiment of the invention, the end of the flexible pouch opposite its anchoring to the vehicle panel includes a rigid member to which a strap can be attached for controlling the roll-up storage pouch.

19 Claims, 1 Drawing Sheet

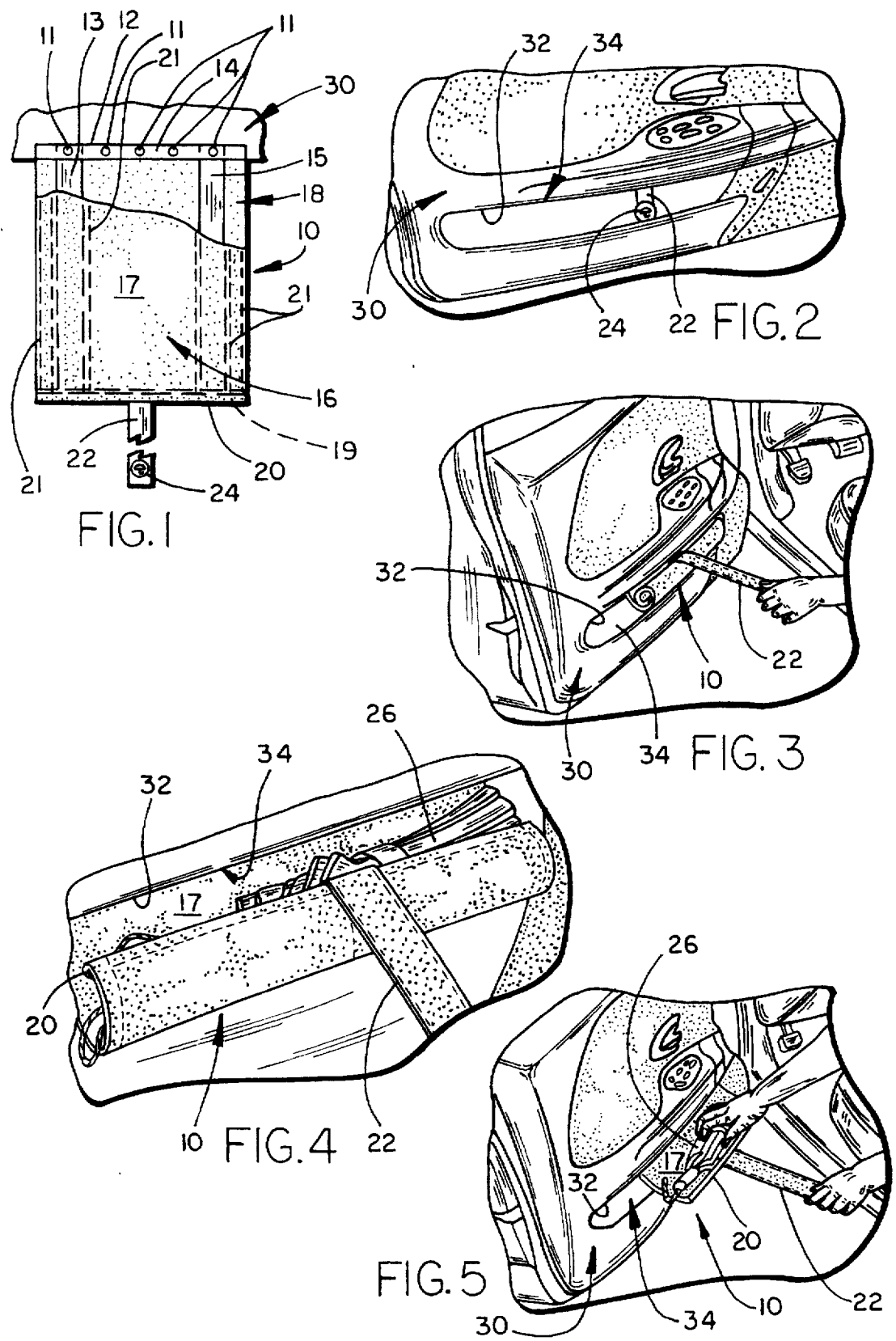

ROLL-UP STORAGE SYSTEM

BACKGROUND OF THE INVENTION

The present invention relates to a storage system for a vehicle and particularly to a roll-up storage pouch.

The storage of items such as umbrellas in a vehicle is somewhat awkward and requires a significant amount of space typically not available unless relatively large door pockets or the like are provided. With the increasing popularity of door panels which include integral armrests and control switches or the like for vehicle windows and door locks, the door panels frequently have been enlarged and extend inwardly to define a horizontal armrest surface. Below the door panels, storage pockets can be provided but typically are relatively small and accommodate only relatively small personal items.

One unique use of the door panel space is disclosed in copending U.S. patent application Ser. No. 08/747,451, filed Nov. 12, 1996, and entitled FOLDING STORAGE COMPARTMENT which discloses a pivot-out folding floor and sidewall storage compartment. The system of the present invention provides yet another unique storage concept and structure for use in connection with a vehicle panel such as a door panel.

SUMMARY OF THE PRESENT INVENTION

The system of the present invention comprises a roll-up storage pouch comprising a generally rectangular sheet of flexible material having one end anchored to a door panel and integrally including a constant-force flat spring which in a stable state is coiled and which can be uncoiled and straightened. The rectangular flexible member thus can be rolled up and enclose items, such as an umbrella, therein. By mounting one end of the pouch to the inside upper edge of a door panel, a heretofore unused area of the door panel may be employed for storage of items. In a preferred embodiment of the invention, the end of the flexible pouch opposite its anchoring to the vehicle panel includes a rigid member to which a strap can be attached for controlling the roll-up storage pouch so defined. These and other features, objects and advantages of the present invention will become apparent upon reading the following description thereof together with reference to the accompanying drawings.

BRIEF DESCRIPTION OF THE DRAWINGS

FIG. 1 is a plan view, partly broken away and partly in phantom form of the flexible roll-up storage pouch of the present invention;

FIG. 2 is a fragmentary perspective view of a vehicle door panel including a roll-up storage pouch according to the present invention, shown in a stored position;

FIG. 3 is a fragmentary perspective view of the structure shown in FIG. 2, showing the pouch in a partially withdrawn position;

FIG. 4 is an enlarged fragmentary perspective view of the roll-up pouch shown in FIG. 3; and FIG. 5 is a fragmentary perspective view of the pouch of FIG. 4 shown in its extended position for insertion or removal of an item to be stored therein.

DETAILED DESCRIPTION OF THE PREFERRED EMBODIMENT

Referring initially to FIG. 1, there is shown a roll-up storage pouch embodying the present invention. The storage pouch 10 is adapted to be mounted to a panel of a vehicle such as a door panel 30 shown in FIGS. 2–5 and for such purpose has one edge 12 which is secured within the door panel by suitable fastening means such as an elongated narrow mounting plate 14 secured to the door panel 30 by fastening screws 11 or the like. The roll-up pouch 10 comprises an upper panel 16 of flexible material, such as fabric, vinyl or leather, and a lower panel 18 of a flexible material cut in a generally rectangular pattern. Panels 16 and 18 can be of the same material or can include different colored or types of flexible material.

Sandwiched between the upper and lower panels 16 and 18 are a pair of constant-force springs 13 and 15, respectively, which are elongated flat steel springs which are preformed to coil upon themselves with a constant force. Springs 13, 15 can be of the type commercially available from Vulcan Corporation or other commercial sources. The springs 13, 15 extend from the edge 12 to a forward edge 20 of roll-up pouch 10 and are attached to a rigid bar cross member 19 also sandwiched between layers 16 and 18 of the roll-up pouch. The cross member 19 provides an anchor point for the ends of springs 13 and 15 as well as a rigid edge to which a strap 22 can be attached for withdrawing the roll-up pouch from the vehicle door panel, as illustrated in FIGS. 2–5. A center spring may also be employed. The end of strap 22 can include an indicia 24 printed thereon, such as an umbrella symbol illustrating the hidden storage area of an umbrella under the door panel 30, as seen in FIG. 2. Panels 16 and 18 can be stitched together in overlying adjacent relationship by sewing, as shown at 21 (FIG. 1), around their borders and adjacent the springs 13, 15 to hold the constant force springs in place. Other fastening meals, such as a flexible adhesive, thermo bonding and the like, could also be employed to hold the springs and panels together. In some embodiments, only a single panel can be employed, in which case a pocket may be used for holding the springs 13, 15 to such a panel.

As can be seen with reference to FIGS. 2–5, the inner surface 17 of panel 16 can hold items, such as a fold-up umbrella 26, which can be inserted and removed when strap 22 is withdrawn to straighten the roll-up pouch. As the tension on strap 22 is released, edge 20 rolls inwardly to surround the item to be stowed, such as an umbrella, and springs 13 and 15 coil the roll-up pouch into the door panel 30. This operation of the roll-up storage pouch 10 is illustrated in FIGS. 2–4. In FIG. 2, the pouch 10 is fully concealed within the space 32 behind door panel 30 with only the strap 22 being visible exposing the indicia 24 which, in the preferred embodiment, comprises an umbrella symbol. The edge 12 of the pouch typically will be secured to an outside wall of the panel 30 behind and above the ledge 34. The strap can be gripped as illustrated in FIG. 3 withdrawing the storage pouch from under door panel 30, as seen in FIGS. 3 and 4, until, as seen in FIG. 5, the substantially opened pouch can be accessed to insert or remove an item to be stored against the inner surface 17 thereof. The strap is then released and the constant-force springs 13, 15 recoil again rolling the storage pouch into the concealed area behind door panel 30 as seen in FIG. 1.

Thus, with the system of the present invention, a concealed compact storage pouch which coils upon itself to encompass an item to be stored is provided and can be conveniently mounted to panel locations in a vehicle previously unused. The panels 16 and 18 of the roll-up pouch of the present invention can be selected from a material to conform to the interior of the vehicle providing an attractive and compact storage device even if not mounted to be concealed under or behind a panel.

It will become apparent to those skilled in the art that various modifications to the preferred embodiment of the invention as described herein can be made without departing from the spirit or scope of the invention as defined by the appended claims.

The embodiment of the invention in which an exclusive property is claimed are defined as follows:

1. A roll-up storage pouch for a vehicle comprising:

a panel of flexible material having one edge for attaching to a vehicle and extending in a direction orthogonal to said one edge a length for enclosing an object for storage;

at least one elongated generally flat constant-force spring secured to said panel aligned in said direction orthogonal to said one edge and along the length of said panel for rolling said panel upon itself to an enclosing position and allowing said panel to be unrolled to an open position for receiving items to be stored; and means for gripping an edge of said panel for unrolling said panel for access to the storage area therein.

2. The roll-up storage pouch as defined in claim 1 wherein said panel includes a first end and means for anchoring said first end to a vehicle.

3. The roll-up storage pouch as defined in claim 2 wherein said panel includes an opposite end and said means for gripping includes a rigid bar extending along an edge thereof.

4. The roll-up storage pouch as defined in claim 3 wherein means for gripping further includes a strap anchored to said rigid bar.

5. A roll-up storage pouch for a vehicle comprising:

a pair of panels of flexible material in adjacent relationship;

at least one constant-force spring, said constant-force spring sandwiched between said pair of panels, for rolling said panels upon themselves to an enclosing position and allowing said panels to be unrolled to an open position for receiving items to be stored; and means for gripping an edge of said panels for unrolling said panels for access to the storage area therein.

6. The roll-up storage pouch as defined in claim 5 wherein said pouch includes a pair of spaced, generally parallel, constant-force springs sandwiched between said pair of panels.

7. The roll-up storage pouch as defined in claim 6 wherein said means for gripping said panel includes a strap attached to a free end of said panel.

8. A roll-up storage pouch for a vehicle comprising:

a panel made of a pair of sheets of flexible material;

at least one constant-force spring sandwiched between said sheets for rolling said panel upon itself to an enclosing position and allowing said panel to be unrolled to an open position for receiving items to be stored; and a strap attached to an edge of said panel for unrolling said panel for access to the storage area therein.

9. The roll-up storage pouch as defined in claim 8 wherein said pouch includes a pair of spaced, generally parallel, constant-force springs.

10. The roll-up storage pouch as defined in claim 9 wherein said panel includes a first end and means for anchoring said first end to a vehicle.

11. The roll-up storage pouch as defined in claim 10 wherein said panel includes an opposite end which includes a rigid cross-member to which said strap is attached.

12. The roll-up storage pouch as defined in claim 11 wherein said flexible material comprises a fabric.

13. A vehicle panel including a roll-up storage pouch comprising:

a vehicle panel including a recess formed therein;

a flexible, generally rectangular panel;

at least one constant-force spring secured to said rectangular panel for rolling said flexible panel upon itself to an enclosing position and allowing said flexible panel to be unrolled to an open position for receiving items to be stored; and means for unrolling said flexible panel for access to the storage area therein.

14. The vehicle panel as defined in claim 13 wherein said vehicle panel is mounted to a door.

15. The vehicle panel as defined in claim 14 wherein said flexible panel includes a pair of sheets of flexible material and said constant-force spring is sandwiched between said sheets of flexible material.

16. The vehicle panel as defined in claim 15 wherein said flexible panel includes a pair of spaced, generally parallel, constant-force springs sandwiched between said pair of sheets.

17. The vehicle panel as defined in claim 16 wherein said means for unrolling said flexible panel comprises a strap attached to a free end of said panel.

18. The vehicle panel as defined in claim 17 wherein said flexible panel includes a first end and means for anchoring said first end to said vehicle panel within said recess.

19. The vehicle panel as defined in claim 18 wherein said opposite end of said flexible panel includes a rigid bar to which said strap is attached.

* * * * *